(12) United States Patent
Fu et al.

(10) Patent No.: US 7,633,929 B1
(45) Date of Patent: Dec. 15, 2009

(54) ARRANGEMENT FOR PROVIDING ISUP TRANSPARENCY ACROSS VOICE OVER PACKET NETWORKS BASED ON DETERMINED EXCHANGE TYPE

(75) Inventors: Taiqi Fu, San Ramon, CA (US); Selvakumaran N. Subramanian, Fremont, CA (US); Thang Tat Do, Cupertino, CA (US); Henry Louis Fourie, Los Gatos, CA (US); Paul Farah, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 1121 days.

(21) Appl. No.: 10/409,583

(22) Filed: Apr. 9, 2003

(51) Int. Cl.
H04L 12/66 (2006.01)
H04L 12/28 (2006.01)
H04L 12/56 (2006.01)
H04J 3/16 (2006.01)
H04J 3/22 (2006.01)
H04M 7/00 (2006.01)

(52) U.S. Cl. .................. 370/352; 370/389; 370/401; 370/466; 370/467; 379/219

(58) Field of Classification Search .................. 370/352, 370/236, 395.52, 466, 401, 467, 389; 379/219, 379/142.18, 201.01, 207.02, 220.01, 93.23, 379/265.09
See application file for complete search history.

(56) References Cited

U.S. PATENT DOCUMENTS

| | | | |
|---|---|---|---|
| 6,724,747 B1 * | 4/2004 | Arango et al. ............... | 370/352 |
| 6,741,585 B1 * | 5/2004 | Munoz et al. ............... | 370/352 |
| 6,754,180 B1 * | 6/2004 | Christie ...................... | 370/236 |
| 6,842,447 B1 * | 1/2005 | Cannon ...................... | 370/352 |
| 6,876,646 B1 * | 4/2005 | Dore et al. .................. | 370/352 |
| 7,136,387 B2 * | 11/2006 | Gallant et al. .......... | 370/395.52 |
| 7,142,534 B1 | 11/2006 | Whent et al. | |
| 7,346,076 B1 * | 3/2008 | Habiby et al. ............... | 370/466 |

OTHER PUBLICATIONS

Donovan, "The SIP Info Method", Network Working Group, Request for Comments: 2976, Oct. 2000, pp. 1-9.
Rosenberg et al., "SIP: Session Initiation Protocol", Network Working Group, Request for Comments: 3261, Jun. 2002, pp. 1-269.
Camarillo et al., "Integrated Services Digital Network (ISDN) User Part (ISUP) to Session Initiation Protocol (SIP) Mapping", Network Working Group, Request for Comments: 3398, Dec. 2002, pp. 1-68.

(Continued)

*Primary Examiner*—Thjuan K Addy
(74) *Attorney, Agent, or Firm*—Leon R. Turkevich

(57) ABSTRACT

A Voice over Packet (VoP) network includes an ingress gateway and an egress gateway for transparent transport of signaling messages between source and destination telephony switches utilizing respective source and destination telephony signaling protocols. The ingress gateway is configured for interfacing with the source telephony switch according to the source telephony signaling protocol and the egress gateway is configured for interfacing with the destination telephony switch according to the destination telephony signaling protocol. The ingress gateway and the egress gateway are configured for sharing information, based on a signaling message received by the ingress gateway from the source telephony switch, to determine a selected exchange type to be used by the ingress gateway and egress gateway in transporting the signaling message to the destination telephony switch.

48 Claims, 6 Drawing Sheets

OTHER PUBLICATIONS

ITU-T Recommendation H.323, "Packet-based multimedia communications systems", Series H: Audiovisual and Multimedia Systems, Infrastructure of audiovisual services—Systems and terminal equipment for audiovisual services, Nov. 2000, pp. i-xii and 1-242 (258 total pages).

ITU-T Recommendation Q.764, "Signalling system No. 7—ISDN user part signalling procedures", Series Q: Switching and Signalling, Specifications of Signalling System No. 7—ISDN user part. Dec. 1999, pp. i-vi and 1-99 (110 total pages).

* cited by examiner

ARRANGEMENT FOR PROVIDING ISUP TRANSPARENCY ACROSS VOICE OVER PACKET NETWORKS BASED ON DETERMINED EXCHANGE TYPE

BACKGROUND OF THE INVENTION

1. Field of the Invention

The present invention relates to transfer of signaling parameters, generated according to a prescribed source telephony protocol of a source network, to a destination network via a transport network having a transport protocol distinct from the source and destination networks.

2. Description of the Related Art

The existing telephony standard Q.764 by the International Telecommunication Union Telecommunication Standardization Sector (ITU-T) specifies that typically two types of exchanges exist in a telephony network: a "Type A" exchange and a "Type B" exchange. The "Type A" exchange is configured as an interworking point, where one protocol is converted into another protocol. An example of a Type A exchange is an end office switch that converts between ISDN User Part (ISUP) and ISDN for PBX access. The "Type B" exchange is configured as a transit node, where ISUP messages are passed with essentially no modification. Examples of a Type B exchange include toll switches or transit switches.

Hence, existing switching requirements (according to ITU Q.764) specify that the Type A exchange, configured for terminating signaling traffic, be able to understand a received ISUP signaling message; if the received ISUP signaling message is not understood by the Type A exchange, then the signaling message is dropped. The Type B exchange passes all ISUP messages, regardless of whether the ISUP messages and/or parameters are unrecognized.

Existing Voice over Packet (VoP) networks, for example Voice over IP (VoIP) based networks implementing VoIP protocols utilizing Session Initiation Protocol (SIP) or H.323, are limited in their respective abilities of transporting SS7 signaling information from a source network, for example a TDM based PSTN network, to a destination PSTN system via the VoP transport network. For example, an edge device (e.g., an ingress gateway) serving as an interface between a TDM network and an IP network may filter certain parameters of ISDN User Part (ISUP) messages and transport a subset of ISUP parameters to a destination (e.g., an egress gateway). Consequently, many features implemented in a conventional TDM based public switched telephone network cannot currently be performed within an IP domain.

Further, concerns arise about the ability of the Voice over Packet (VoP) network to "appear" to a PSTN network as another PSTN switch in order to obtain transparency in transporting ISUP messages between ingress PSTN trunk groups and egress PSTN trunk groups.

FIG. 1 is a diagram illustrating a conventional internetworking arrangement 10 between a source PSTN switch (SW1) 12, a destination PSTN switch (SW2) 14, and a VoP exchange 16 configured for passing signaling messages between the switches 12 and 14 via respective trunk groups 22*a* and 22*b*. The VoP exchange 16 includes a VoP network 18 of distributed components 20 (e.g., 20*a* and 20*b*) that are effectively aggregated to operate as a single virtual telephone switch. The components 20 are geographically distributed, enabling voice, data, and signaling traffic to be transported more economically via the packet network 18.

The VoP exchange 16 includes an ingress gateway 20*a* and an egress gateway 20*b* so labeled with respect to the direction of call establishment for a given call. The ingress gateway 20*a* and egress gateway 20*b* may be implemented, for example, as media gateway controllers (MGC1 and MGC2) having respective associated media gateways (MG1 and MG2). A media gateway is a logical entity that controls media connections. A media gateway controller is a logical entity that manages the establishment of calls across the VoP network 18. The gateways 20*a* and 20*b* may be configured for operating either according to Session Initiation Protocol (SIP) per IETF RFC 3261 or H.323 protocol. The ingress gateway 20*a* is configured for sending and receiving signaling messages with the source PSTN switch (SW1) 12 via the trunk group 22*a* according to a corresponding source telephony protocol 24*a* (ISUP-X). The egress gateway 20*b* is configured for sending and receiving signaling messages with the destination PSTN switch (SW2) 14 via the trunk group 22*b* according to a corresponding destination telephony protocol 24*b* (ISUP-Y).

The VoP exchange 16 needs to appear to the adjacent switches 12 and 14 as a single PSTN switch; in other words, the VoP exchange must support the Type A/Type B exchange requirement according to Q.764 in order to provide ISUP transparency for calls between the PSTN switches 12 and 14. If the ingress ISUP protocol (ISUP-X) 24*a* and the egress ISUP protocol variant (ISUP-Y) are the same, then the VoP exchange 16 needs to function as a Type B exchange; consequently, messages or parameters are to be passed by the VoP exchange 16 if instructed by Message Compatibility or Parameter Compatibility information, regardless of whether the VoP exchange 16 does not recognize certain messages or parameters. In contrast, if the ingress ISUP protocol (ISUP-X) 24*a* and the egress ISUP protocol variant (ISUP-Y) are different, then the VoP exchange 16 needs to function as a Type A exchange; consequently, any unrecognized messages or parameters received by the VoP exchange 16 would be ignored.

However, since the VoP exchange 16 is implemented by distributed components (e.g., 20*a* and 20*b*), the knowledge of ingress and egress trunk group types is not at a central location (as in a PSTN switch), but rather is local to the respective ingress gateway controller 20*a* and egress gateway controller 20*b* at the edges of the VoP network 16. Further, origination/destination paths between respective ingress/egress gateways may vary on a call-by-call basis; hence, the ingress gateway 20*a* and egress gateway 20*b* cannot be preconfigured for Type A operations or Type B operations, the necessity for a Type A operation or Type B operation is dependent on the origination/destination path for a given call. Consequently, there is a concern that ISUP transparency cannot be attained by the VoP network 16.

SUMMARY OF THE INVENTION

There is a need for an arrangement that enables an ingress gateway and an egress gateway of a Voice over Packet (VoP) network, each configured for interfacing with a signaling link having a corresponding prescribed telephony signaling protocol, to determine a shared exchange type based on the respective prescribed telephony signaling protocols.

There also is a need that enables the ingress gateway and egress gateway to determine the shared exchange type on a per-call basis.

There also is a need for an arrangement that enables a VoP network, having distributed gateways coupled to trunk groups having respective telephony protocols, to provide signaling transparency between the trunk groups.

These and other needs are attained by the present invention, where a Voice over Packet (VoP) network includes an ingress gateway and an egress gateway for transparent transport of signaling messages between source and destination telephony switches utilizing respective source and destination telephony signaling protocols. The ingress gateway is configured for interfacing with the source telephony switch according to the source telephony signaling protocol and the egress gateway is configured for interfacing with the destination telephony switch according to the destination telephony signaling protocol. The ingress gateway and the egress gateway are configured for sharing information, based on a signaling message received by the ingress gateway from the source telephony switch, to determine a selected exchange type to be used by the ingress gateway and egress gateway in transporting the signaling message to the destination telephony switch.

Hence, the sharing of information between the ingress gateway and the egress gateway based on the received signaling message enables the gateways to select an exchange type to ensure signaling transparency between the source and destination telephony switches.

One aspect of the present invention provides a method in an ingress gateway configured for interfacing with a source telephony switch according to a source telephony signaling protocol and communicating with an egress gateway via a Voice over Packet (VoP) network. The method includes receiving from the source telephony switch according to the source telephony signaling protocol a signaling message destined for a destination telephony switch. The method also includes sending, to the egress gateway via the VoP network, a setup message that includes first information describing the source telephony signaling protocol, the egress gateway configured for interfacing with the destination telephony switch according to a destination telephony signaling protocol. The method also includes receiving from the egress gateway a message that includes second information related to the destination telephony signaling protocol, and outputting the signaling message to the egress gateway according to a determined exchange type based on the second information.

Another aspect of the present invention provides a method in an egress gateway configured for interfacing with a destination telephony switch according to a destination telephony signaling protocol and communicating with an ingress gateway via a Voice over Packet (VoP) network. The method includes receiving from the ingress gateway a setup message that includes first information describing a source telephony signaling protocol used by the ingress gateway for interfacing with a source telephony switch having sent a signaling message destined for the destination telephony switch. The method also includes sending a message that includes second information related to the destination telephony signaling protocol to the ingress gateway in response to the setup message. Call setup is initiated with the destination telephony switch according to the destination telephony signaling protocol, and according to an exchange type determined based on the source telephony signaling protocol and the destination telephony signaling protocol.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, where elements having the same reference numeral designations indicate like elements throughout and wherein.

BEST MODE FOR CARRYING OUT THE INVENTION

The disclosed embodiments are directed to determining the exchange type for ISUP transparency in Voice over Packet networks. In particular, the disclosed embodiments address the need for an ingress gateway and an egress gateway to communicate between each other about the ISUP variants they encounter for each call.

Figure 1:
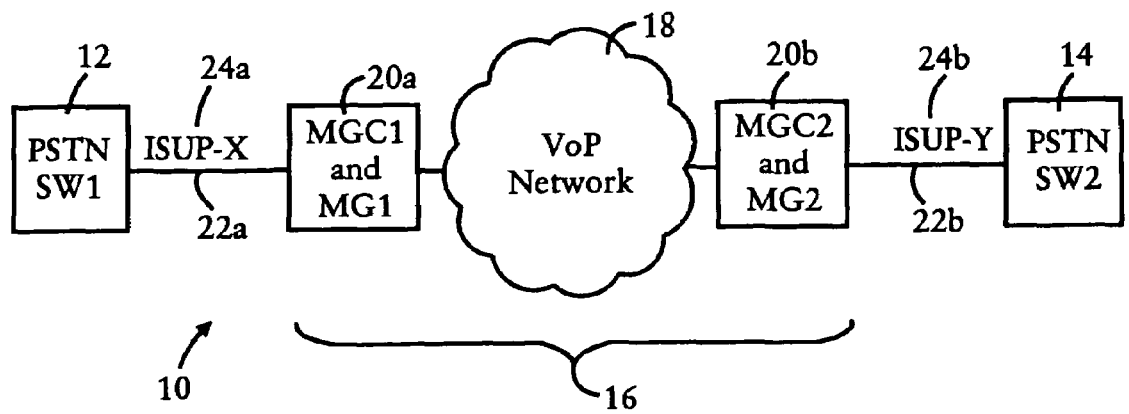
FIG. 1 is a diagram illustrating a prior art internetworking arrangement.
Figure 2:
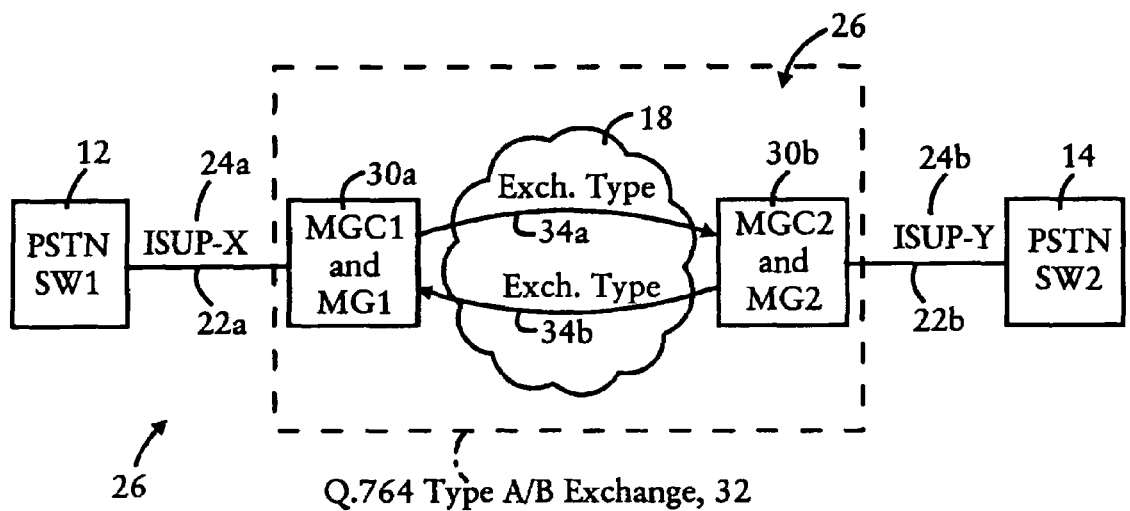
FIG. 2 is a diagram illustrating ISUP transparent transfer of signaling information across Voice over Packet nodes having established a selected exchange type, according to an embodiment of the present invention.

FIG. 2 is a diagram illustrating an arrangement 26 for providing ISUP transparency between a source telephony switch (SW1) 12 and a destination telephony switch (SW2) 14, according to an embodiment of the present invention. As described with respect to FIG. 1, the switches 12 and 14 are configured for sending and receiving signaling messages via trunk groups 22$a$ and 22$b$ (in band or out-of-band) according to ISUP variant protocols 24$a$ and 24$b$, respectively. A VoP exchange 26, configured for passing the signaling messages between the switches 12 and 14, includes a VoP network 18, an ingress gateway 30$a$, and an egress gateway 30$b$. The VoP network may be implemented as a Voice over IP (VoIP) network, a Voice over ATM (VoATM) network, or a Voice over Frame Relay network.

Unlike the gateways 20$a$ and 20$b$, the ingress and egress gateways 30$a$ and 30$b$ are configured for exchanging information (e.g., 34$a$ and 34$b$), for example ISUP variant information and/or exchange type selection information (e.g., Type A selected or Type B selected). As described below with respect to FIGS. 5A and 5B, the ingress gateway 30$a$ is configured for sending in the "forward direction" information 34$a$ specifying the source PSTN signaling protocol type (ISUP-X) 24$a$; the egress gateway 30$b$ is configured for sending in the "backward direction" information 34$b$ specifying the destination PSTN signaling protocol type (ISUP-Y) 24$b$ and/or the determined PSTN exchange type 32 to be used. Hence, the ingress and egress gateways 30$a$ and 30$b$ are able to establish a single Q.764 compliant exchange 32 that operates either as a Type A interworking exchange, or a Type B transit node. Hence, the exchange 32 established by the gateways 30a and 30b for a given call appear to the PSTN switches 12 and 14 as a Q.764-complaint PSTN switch.

Further, since the exchange type needs to be determined based on the egress gateway 30b, the passing of information 34a and 34b enables the ingress gateway 30a to set its exchange type 32 on a per-call basis, with minimal burden of management resources in the VoP network 18.

Figure 3:
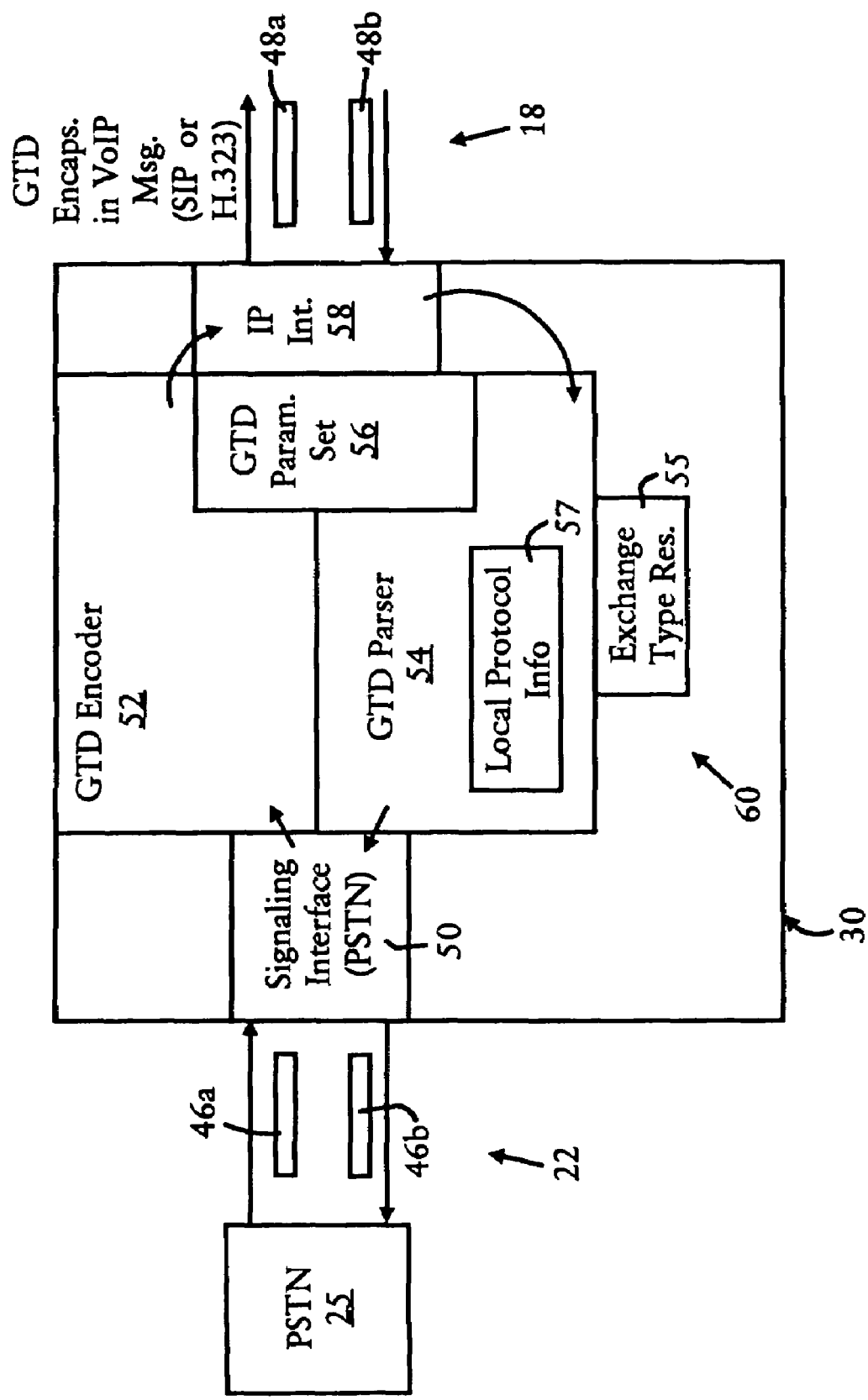
FIG. 3 is a diagram illustrating in detail the gateway nodes of FIG. 2.

FIG. 3 is a block diagram illustrating a gateway 30 configured for interfacing with a PSTN switch 25 via a telephony network signaling link 22 (e.g., 22a or 22b) and the VoP network 18, according to an embodiment of the present invention. The gateway 30 is configured for receiving a signaling message 46a (e.g., an IAM message) according to the corresponding source telephony protocol 22a, for example ISUP, Q.BICC, and TUP. The gateway 30 includes resources 52 for generating a generic transparency descriptor, specifying generic attributes for describing the signaling message to be transported by an IP based transport message 48a according to a prescribed IP-based protocol, for example SIP or H.323.

In particular, the gateway 30 includes a signaling interface 50, an IP interface 58, and an interworking resource 60 that includes a generic transparency descriptor (GTD) encoder 52, a GTD parser 54, and an exchange type management and selection resource 55. The signaling interface 50 is configured for receiving a signaling message 46a from the telephony switch 25 according to the corresponding telephony protocol (e.g., ISUP-X 24a), and outputting a signaling message 46b to the telephony network 32 according to the telephony protocol 24a.

The GTD encoder 52 is configured for generating an IP based transport message 48a, for example a Voice over IP (VoIP) message implemented according to SIP protocol or H.323 protocol, that encapsulates a generic transparency descriptor that specifies generic attributes for describing the signaling message, based on a GTD parameter set 56. The IP interface 58 is configured for outputting the VoIP message 48a onto the packet network 18 for transfer to the remote gateway (e.g., the egress gateway 30b).

The IP interface 58 also is configured for receiving transport messages 48b carrying generic transparency descriptor objects. The GTD parser 54 is configured for parsing the IP-based (e.g., SIP or H.323) message to recover the generic transparency descriptor objects carrying PSTN information. As described below, the generic transparency descriptor includes codes and tags that enable the GTD parser 54 to determine the PSTN telephony protocol, and message type, enabling the GTD parser 54 to selectively generate a signaling message according to the local telephony protocol based on a GTD parameter set 56 and local protocol information 57, even if the originating telephony protocol is different from the local PSTN telephony protocol.

In particular, the generic transparency descriptor objects are text-based objects that enable the GTD encoder 52 to map the parameters specified in the signaling message to a superset of normalized parameters specified in a GTD parameter set 56. The GTD parameter set 56 is configured for storing signaling message parameters specified by multiple telephony protocols, including ANSI T1.113, ITU-T Q.761-Q.764. Moreover, the GTD parameter set includes identifier codes for identification of field tags, parameter types, message types, protocol names, and unrecognizable data elements. A more detailed description of the generation and use of GTD objects is disclosed in commonly-assigned, application Ser. No. 10/122,238, filed Apr. 16, 2002, entitled "ARRANGEMENT FOR PROTOCOL INDEPENDENT TRANSFER OF CONTROL PARAMETERS ACROSS INTERNETWORKS USING GENERIC TRANSPARENCY DESCRIPTOR OBJECTS" and having issued as U.S. Pat. No. 7,142,534, the disclosure of which is incorporated in its entirety herein by reference.

Figure 5A:
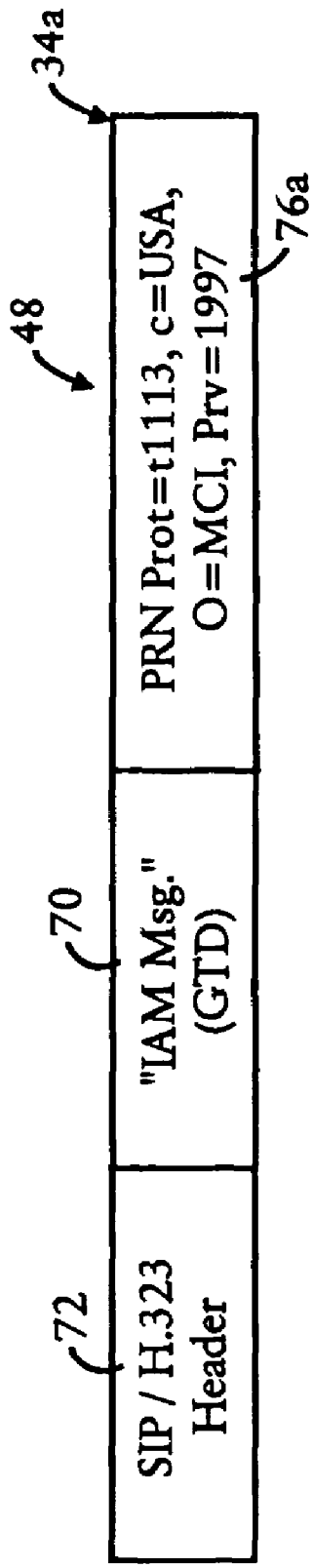
FIGS. 5A and 5B are diagrams illustrating messages output by the ingress gateway and the egress gateway of FIG. 2 for exchange of information, according to an embodiment of the present invention.

Hence, the GTD encoder 52, upon receiving a signaling message, generates a GTD object 70, illustrated in FIG. 5A, that specifies the signaling message using attributes that can be recognized by the egress gateway 20b in reconstructing the signaling message 46a according to the corresponding PSTN telephony signaling protocol (e.g., ISUP-Y 24b).

The exchange type management and selection resource 55 is configured for encapsulating and sending the signaling message according to selection of either exchange Type A or Type B, based on either an initial default selection (e.g., set default exchange type to Type B), based on detecting an exchange type specified by the egress gateway, or based on determining the compatibility between the source telephony signaling protocol (ISUP-X) 24a and the destination telephony signaling protocol (ISUP-Y) 24b.

Figure 5B:
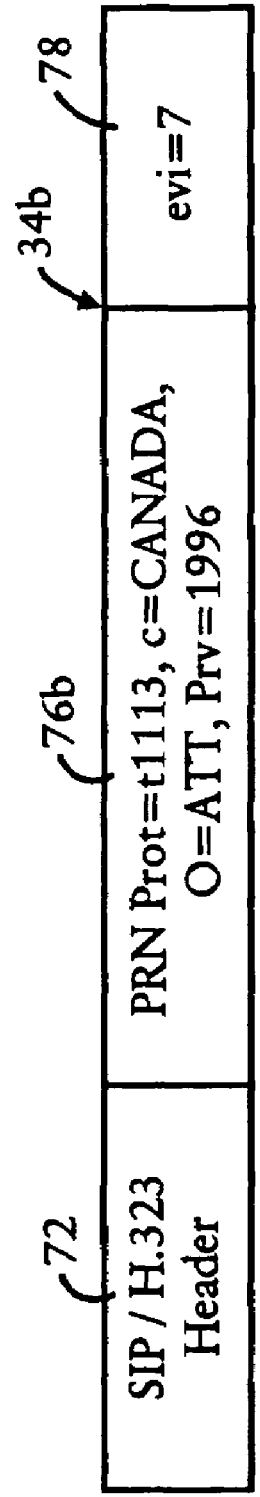

FIGS. 5A and 5B are diagrams illustrating messages output by the ingress gateway 30a and the egress gateway 30b of FIG. 2 for exchange of information 34a and 34b, respectively, according to an embodiment of the present invention. FIG. 5A illustrates a signaling message (e.g., a setup message) 48 output by the ingress gateway 30a to the egress gateway 30b, according to an embodiment of the present invention. The signaling message includes a VoP header 72, the GTD object 70 that specifies (i.e., describes) the signaling message 46a received by via the signaling link 22 according to the corresponding telephony protocol (e.g., ISUP-X) 24a, and exchange type information 34a. The exchange type information 34a includes a second GTD object 76a that specifies the corresponding signaling protocol (e.g., ISUP-X) 24a used by the gateway 30a in receiving the corresponding signaling message. As described in detail with respect to the above-incorporated application Ser. No. 10/122,238, the expression "PRN Prot=t1113, c=USA, o=MCI, pr-v=977" of the GTD object 76 specifies a Protocol Name (PRN) declaration (specifying the GTD parameter PRN), where the base protocol identifier (Prot) specifies a value of "t1113" (representing, e.g., ANSI T1.113), the country variant identifier (c) specifies the United States (USA), the operator identifier (o) specifies the operator MCI Communications (MCI), and the operator version (prv) specifies the version used by the operator (1977). Hence, the protocol name precisely identifies the specific protocol by its variation, enabling the GTD parser 54 at the receiving end to identify the protocol and its variation.

FIG. 5B is a diagram illustrating a message 49 generated by the egress gateway 30b, for example an early backward message (EBM), carrying the exchange type information 34b for use by the ingress gateway 30a in selecting an exchange type. The message 49 includes a VoP header 72, and the exchange type information 34b also includes the GTD object 76b describing the corresponding telephony protocol (ISUP-Y) used by the egress gateway 30b for communicating with the corresponding PSTN switch 14. In this case the exchange type information 34b also includes an Event Information (EVI) field 78. The EVI field 78 is a GTD parameter used to carry specific protocol information, in this case exchange type. As illustrated in FIG. 5B, the EVI field has a value of "evi=7", where "evi=7" is used to specify a Type B exchange and "evi=6" is used to specify a Type A exchange. Note that depending on implementation, the message 49 could alternately carry only one of the GTD object 76b or the EVI field 78 as the exchange type information 34b.

Figure 4A:
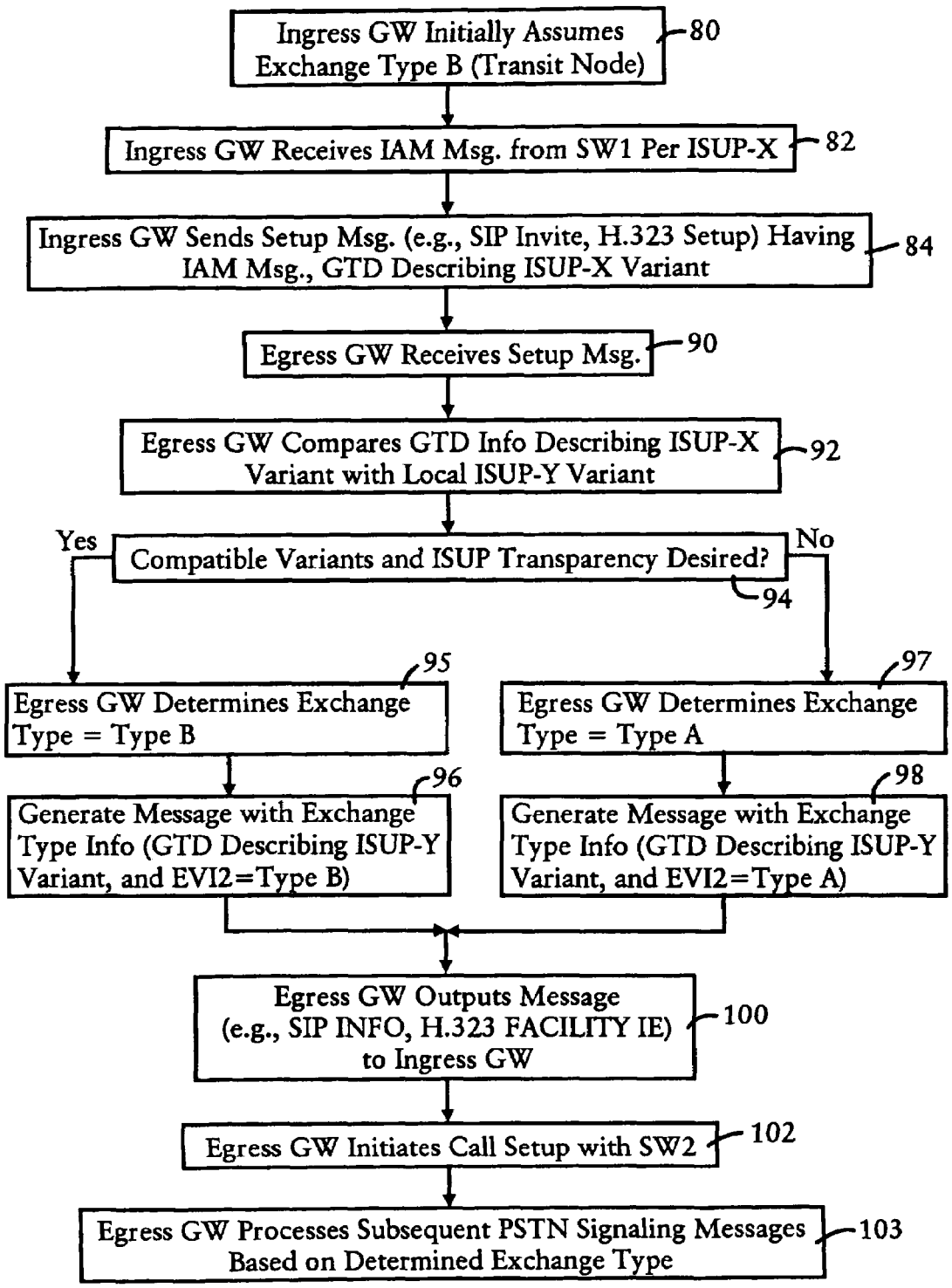
FIGS. 4A and 4B are diagrams illustrating the method of providing ISUP transparent transfer of signaling information based on exchanging information, according to an embodiment of the present invention.
Figure 4B:
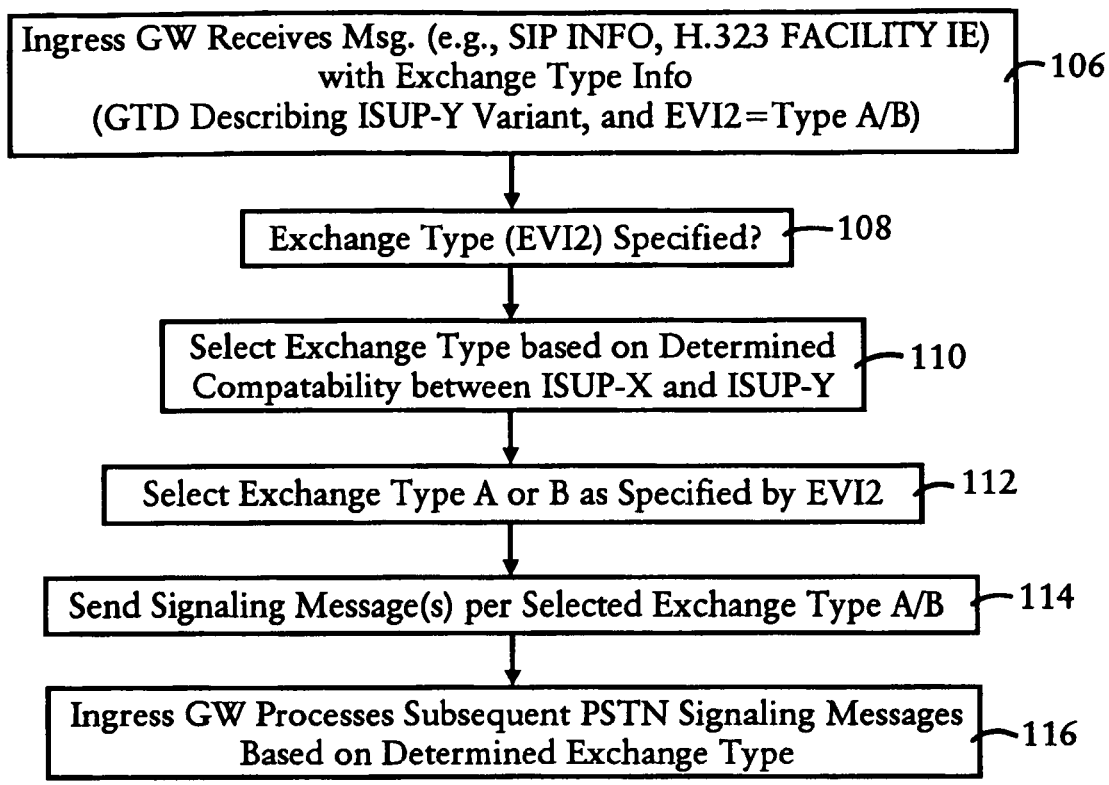
Figure 6A:
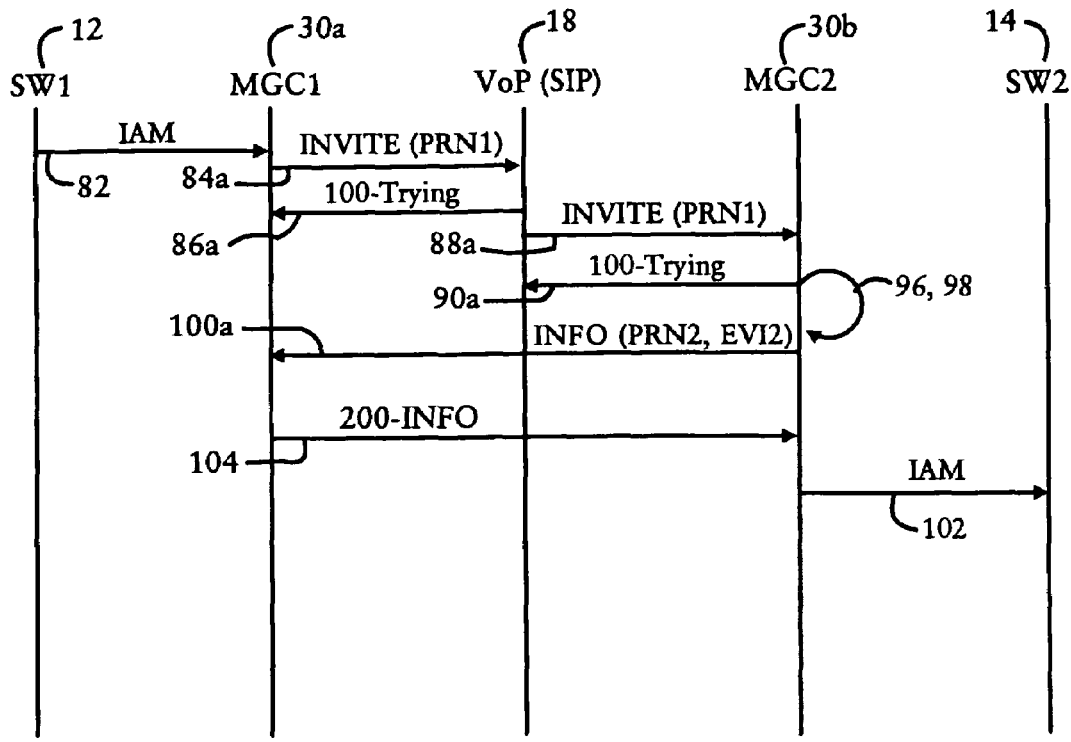
FIGS. 6A and 6B are diagrams illustrating the method of FIGS. 4A and 4B according to Session Initiation Protocol (SIP) and H.323 protocol, respectively.
Figure 6B:
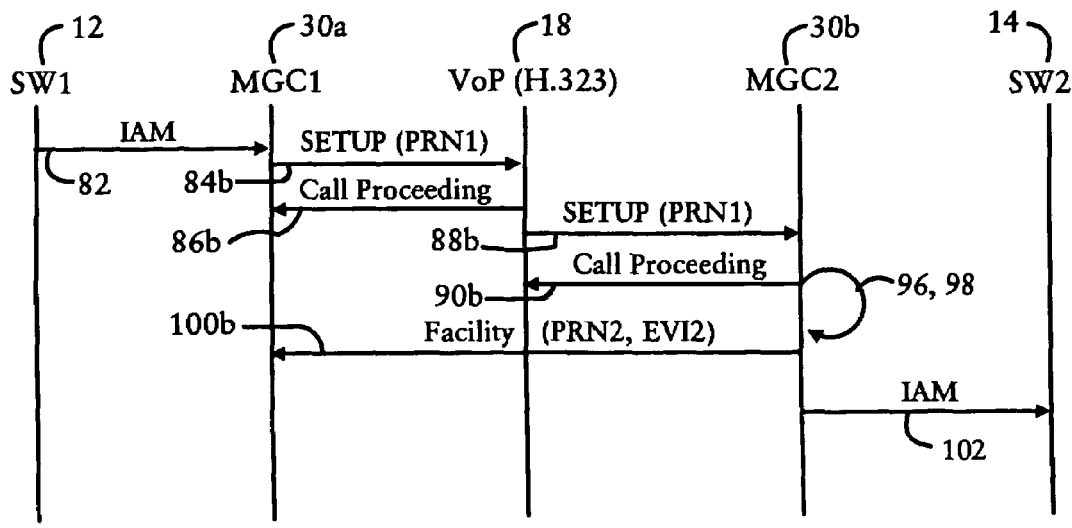

FIGS. 4A and 4B are diagrams illustrating the method of providing ISUP transparent transfer of signaling information based on exchanging exchange type information, according to an embodiment of the present invention. FIGS. 6A and 6B are diagrams illustrating the method of FIGS. 4A and 4B implemented according to Session Initiation Protocol (SIP) and H.323 protocol, respectively. The examples of FIGS. 6A and 6B are by way of illustration of the different types of signaling messages that may be used to convey exchange type information between the ingress and egress gateways 30a and 30b. In addition, the steps described herein with respect to FIGS. 4A, 4B, 6A, and 6B can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

The method begins in step 80, where the ingress gateway 30a initially assumes an exchange Type B configuration as a transit node that passes an incoming message without protocol interworking. As illustrated in FIGS. 4A, 6A, and 6B, signaling interface 50 of the ingress gateway 30a receives in step 82 a signaling message, for example an Initial Address Message (IAM), from the source PSTN switch (SW1) 12 according to the source (i.e., local) ISUP variant protocol (ISUP-X) 24a.

The interworking resource 60 in response generates in step 84 the setup message 48 of FIG. 5A that includes the exchange type information 34a describing the source telephony signaling protocol 24a. In particular, the GTD encoder 52 of the ingress gateway 30a generates the GTD objects 70 and 76a describing the signaling message and the source telephony signaling protocol 24a, respectively. The IP interface 58 outputs the setup message 48 via the VoP network 18 according to a prescribed packet protocol for reception of the setup message 48 by the egress gateway 30b in step 90.

As illustrated in FIG. 6A, the ingress gateway 30a, when configured for outputting messages according to SIP protocol, outputs in step 84a an Invite message carrying the ISUP-X descriptor (PRN1) 76; the SIP network responds by sending in step 86a a "100" message indicating it is trying to complete the call. The SIP network forwards in step 88a the Invite message to the egress gateway 30b, and the egress gateway acknowledges receipt of the Invite message in step 90a by outputting a "100" message.

As illustrated in FIG. 6B, the ingress gateway 30a, when configured for outputting messages according to H.323 protocol, outputs in step 84b a Setup message carrying the ISUP-X descriptor (PRN1) 76; the H.323 network responds by sending in step 86b a "Call Proceeding" message indicating it is trying to complete the call. The H.323 network forwards in step 88b the Setup message to the egress gateway 30b, and the egress gateway acknowledges receipt of the Setup message in step 90b by outputting a "Call Proceeding" message.

Referring to FIG. 4A, the GTD parser 54 of the egress gateway 30b compares in step 92 the exchange type information 34a, including the GTD object 76 describing the source telephony protocol (ISUP-X) 24a with the local (i.e., destination) telephony signaling protocol (ISUP-Y) 24b.

If in step 94 the GTD parser 54 determines ISUP variants 24a and 24b are compatible (e.g., the respective GTD objects include matching variables), and that ISUP transparency is desired, the egress gateway 30b determines (i.e., selects) in step 95 exchange Type B as the exchange type to be used; the interworking resource 60 generates in step 96 a message 49, illustrated in FIG. 5B, that specifies the exchange type information 76b for the destination telephony signaling protocol (ISUP-Y) 24b, and that includes an event identifier 78 specifying a Type B exchange (EVI2=TypeB=7).

If in step 94 the GTD parser 54 determines ISUP variants 24a and 24b are incompatible (e.g., the respective GTD objects include non-matching variables), or that ISUP transparency is not desired, the egress gateway 30b determines (i.e., selects) in step 97 exchange Type A as the exchange type to be used; the interworking resource 60 generates in step 98 a message 49 that specifies the exchange type information 76 for the destination telephony signaling protocol (ISUP-Y) 24b, and that includes an event identifier 78 specifying a Type A exchange (EVI2=TypeA=6).

Once the interworking resource 60 generates in step 96 or 98 the appropriate message, the interworking resource 60 of the egress gateway 30b is able to output the message in step 100 to the ingress gateway 30a.

One issue involving the call processing sequence involves the order in which messages are sent back by the egress gateway 30b to the ingress gateway 30a. One solution according to a first embodiment is to specify exchange type information (e.g., determined exchange type, ISUP information, etc.) within the first backward (end to end) normal call signaling message (i.e, the Normal Backward Message (NBM)) sent from the egress gateway 30b to the ingress gateway 30a. The NBM message may be implemented, for example, as an H.225.0 Alerting message, or a SIP 18x message. The NBM message may carry an embedded ISUP (e.g, GTD-ISUP) message with the protocol name and version of the destination telephony signaling protocol 24b, and/or the exchange type 78 (EVI2) as determined by the egress gateway. The ingress gateway 30a, in response to receiving the NBM, shall apply the same exchange type as the egress gateway.

One disadvantage is that the ingress gateway 30a may receive the NBM relatively late in the call processing sequence, where additional signaling messages have already been forwarded by the ingress gateway 30a. In particular, the ingress gateway 30a may receive additional signaling messages from its interfacing trunk group 22a while awaiting exchange type information from the egress gateway 30b; if the ingress gateway does not timely receive the exchange type information, the ingress gateway 30a may need to either send the signaling messages according to an assumed exchange type, or buffer the signaling messages.

Consider the example of the egress gateway 30b serving a local exchange (LE): the ingress gateway, in response to receiving an initial address message (IAM), sends a forward call setup message to the egress gateway; the egress gateway sends the setup message to the LE 14 serving the telephone. The LE will determine the condition of the telephone line: if the line is not busy, the LE will ring the phone, and send back an Address Complete (ACM) message, enabling the calling party to hear the ring tones via his/her handset. Depending on deployment, the ACM message may not be received by the ingress gateway 30a for an indeterminate interval (e.g., 30-45 seconds) after having sent the forward call setup message. Meanwhile, the originating switch 12 may be sending further messages in the forward direction. Hence, there may be a concern that the ingress gateway may receive additional forward messages and processes messages in a manner inconsistent with the type of internetworking selected by the egress gateway.

According to the embodiment illustrated in FIGS. 4A, 6A and 6B, the egress gateway 30b is configured for outputting to the ingress gateway a message, referred to herein as the Early Backward Message (EBM), immediately upon receipt of the call set up message and upon having determined the exchange type 32 to be used. In other words, the egress gateway 30b, in response to determining the exchange type 32 to be used for a received signaling message from the ingress gateway 30*a*, outputs to the ingress gateway 30*a* the EBM prior to initiating any further call processing on the egress trunk group 22*b*. For example, the egress gateway sends the EBM to the ingress gateway prior to forwarding a received setup message onto an egress trunk group, or prior to performing any interworking of the received setup message. Hence, the EBM minimizes the time during which the ingress gateway must buffer subsequent forward messages. During the interval between the receipt of the call setup and the receipt of the EBM, the ingress gateway 30*a* can assume a Type B exchange configuration in the event a subsequent signaling message is received from the originating switch 12 that needs to be forwarded to the egress gateway 30*b*.

As shown in FIG. 4A, the egress gateway 30*b* outputs the EBM in step 100 to the ingress gateway 30*a*. As illustrated in FIG. 6A, the egress gateway 30*b* may output the EBM in step 100*a* according to SIP protocol by outputting an INFO message carrying the GTD object (PRN2) 76 for the destination telephony signaling protocol 24*b*, and the event information (EVI2) 78 specifying the exchange type 32 selected by the egress gateway 30*b*. The INFO message is generated in accordance with the Internet Engineering Task Force (IETF) Request for Comments (RFC) 2976. Note that the INFO message may be replaced by a "SIP 183" message as specified by the IETF RFC 3398. As illustrated in FIG. 6B, the egress gateway 30*b* may output the EBM in step 100*b* according to H.323 protocol by outputting a Facility message carrying the GTD object (PRN2) 76 for the destination telephony signaling protocol 24*b*, and the event information (EVI2) 78 specifying the exchange type 32 selected by the egress gateway 30*b*.

Once the egress gateway 30*b* has output the message carrying the corresponding exchange type information back to the ingress gateway 30*a*, the egress gateway 30*b* initiates call set up in step 102 of FIG. 4A with the destination telephony switch 14, for example by sending an IAM message according to the destination telephony signaling protocol (ISUP-Y) 24*b* and the determined exchange type 32. Note in FIG. 6A that in the case of SIP protocol, the egress gateway 30*b* also will wait for a "200" message, generated in step 104 by the ingress gateway 30*a* and acknowledging receipt of the INFO message sent in step 100*a*, before outputting the IAM message in step 102. The egress gateway 30*b* continues in step 103 to process subsequent PSTN signaling messages associated with the call in progress based on the determined exchange type.

Referring to FIG. 4B, the ingress gateway 30*a*, in response to receiving in step 106 the message that includes the exchange type information related to the destination telephony signaling protocol 24*b*, selects the exchange type 32 to be used for continued processing of the call in progress. In particular, if in step 108 no exchange type was specified by the message received from the egress gateway 30*b*, the exchange type resource 55 of the ingress gateway 30*a* may select in step 110 the exchange type to be used based on the determined compatibility between the respective telephony signaling protocols ISUP-X 24*a* and ISUP-Y 24*b*; alternately, the exchange type resource 55 may be configured for assuming a Type A exchange unless the received NBM or EBM explicitly specifies a Type B exchange.

Assuming in step 108 that the exchange type (EVI2) was specified, the exchange type resource 55 selects in step 112 the exchange type for the ingress gateway 30*a* as specified by the exchange type (EVI2) in order to match the exchange type selected by the egress gateway 30*b*. The ingress gateway 30*a* sends the signaling messages in step 114 according to the selected exchange type. The ingress gateway 30*a* continues in step 116 to process subsequent PSTN signaling messages associated with the call in progress based on the determined exchange type.

Note that for a call originating from within the VoP network 18 to a PSTN switch 14, the egress gateway 30*b* may receive a call setup message without a GTD-ISUP descriptor object or where the protocol (PRN) identifier specifies a non SS7 protocol (e.g., H.323); in this case, the egress gateway 30*b* would immediately determine the call to be a Type A call and send the EBM accordingly.

In the case of a call from the PSTN switch 12 terminating inside the VoP network 18, the ingress node 30*a* may not receive the EBM backward message but a NBM only. If the ingress gateway 30*a* receives no determined exchange type 78 and no destination signaling protocol type 34*b* in the first backward message (NBM), the ingress gateway 30*a* is to operate as a Type A exchange.

In the case of a call release from the egress side immediately after its receipt of the initial call setup message (Setup/Invite), there is no need to send an EBM message; instead the release message (Disconnect/Bye) may carry the GTD-ISUP message specifying the destination telephony signaling protocol and exchange type, enabling the Disconnect/Bye message to serve as the NBM.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an ingress gateway configured for interfacing with a source telephony switch according to a source telephony signaling protocol and communicating with an egress gateway via a Voice over Packet (VoP) network, the method comprising:

first receiving by the ingress gateway and from the source telephony switch according to the source telephony signaling protocol a signaling message destined for a destination telephony switch;

sending, by the ingress gateway to the egress gateway via the VoP network, a setup message that includes first information describing the source telephony signaling protocol, the egress gateway configured for interfacing with the destination telephony switch according to a destination telephony signaling protocol;

second receiving, by the ingress gateway and from the egress gateway via the VoP network, a message that includes second information describing the destination telephony signaling protocol; and outputting the signaling message by the ingress gateway to the egress gateway via the VoP network according to a determined exchange type based on the second information.

2. The method of claim 1, wherein the first receiving step includes receiving an IAM message as the signaling message according to a first ISDN User Part (ISUP) protocol as the source telephony signaling protocol.

3. The method of claim 2, wherein the sending step includes:

generating a generic transparency descriptor specifying attributes for describing the first ISUP protocol relative to a prescribed superset of normalized parameters, and outputting an IP-based transport message, that includes the signaling message and the generic transparency descriptor, according to one of Session Initiation Protocol (SIP) or H.323 protocol.

4. The method of claim 3, wherein the generating step includes specifying, within the generic transparency descriptor, a protocol name, a base protocol identifier, a country variant identifier, an operator identifier, and an operator version.

5. The method of claim 4, wherein the superset of normalized parameters includes the signaling message parameters specified by ANSI T1.113 and ITU-T Q.761-Q.764 specifications implemented using an IP infrastructure.

6. The method of claim 3, wherein IP-based transport message is output according to SIP protocol, the second receiving step including receiving an INFO message according to SIP protocol that includes the second information.

7. The method of claim 3, wherein IP-based transport message is output according to H.323 protocol, the second receiving step including receiving a Facility message according to H.323 protocol that includes the second information.

8. The method of claim 1, wherein the second information specifies attributes for specifying the destination telephony signaling protocol, the outputting including selecting one of an interworking exchange type or a transit exchange type based on a determined compatibility between the source and destination telephony signaling protocols.

9. The method of claim 1, wherein the second information specifies one of an interworking exchange type or a transit exchange type selected by the egress gateway, the outputting including utilizing the one exchange type specified in the second information for outputting the signaling message.

10. A method in an egress gateway configured for interfacing with a destination telephony switch according to a destination telephony signaling protocol and communicating with an ingress gateway via a Voice over Packet (VoP) network, the method comprising:

receiving, by the egress gateway and from the ingress gateway via the VoP network, a setup message that includes first information describing a source telephony signaling protocol used by the ingress gateway for interfacing with a source telephony switch having sent a signaling message destined for the destination telephony switch;

sending, by the egress gateway, a message that includes second information describing the destination telephony signaling protocol to the ingress gateway via the VoP network in response to the setup message; and initiating call setup by the egress gateway with the destination telephony switch according to the destination telephony signaling protocol, and according to an exchange type determined based on the source telephony signaling protocol and the destination telephony signaling protocol.

11. The method of claim 10, wherein the first information includes a generic transparency descriptor specifying attributes for describing the source telephony signaling protocol relative to a prescribed superset of normalized parameters, the receiving and sending steps each including interfacing with the VoP network according to one of Session Initiation Protocol (SIP) or H.323 protocol.

12. The method of claim 11, wherein the sending step includes specifying within the second information a second generic transparency descriptor that specifies, for the destination telephony signaling protocol, a protocol name, a base protocol identifier, a country variant identifier, an operator identifier, and an operator version.

13. The method of claim 12, wherein the superset of normalized parameters includes the signaling message parameters specified by ANSI T1.113 and ITU-T Q.761-Q.764 specifications implemented using an IP infrastructure.

14. The method of claim 13, wherein the sending step includes sending the message as an INFO message according to SIP protocol.

15. The method of claim 13, wherein sending step includes sending the message as a Facility message according to H.323 protocol.

16. The method of claim 10, wherein the sending step includes:

selecting one of an interworking exchange type or a transit exchange type for the signaling message based on a determined compatibility between the source telephony signaling protocol and the destination telephony signaling protocol; and specifying within the second information the selected one exchange type to be used by the ingress gateway and the egress gateway for the signaling message.

17. The method of claim 10, wherein the initiating call setup step includes initiating the call setup after having sent the message including the second information.

18. The method of claim 10, wherein signaling message is an IAM message, the initiating call setup step including sending a new IAM message according to the destination telephony signaling protocol to the destination telephony switch.

19. An ingress gateway comprising:

a telephony interface configured for receiving from a source telephony switch according to a source telephony signaling protocol a signaling message destined for a destination telephony switch;

an interworking resource configured for generating a setup message that includes first information describing the source telephony signaling protocol, a Voice over Packet (VoP) interface configured for sending, via a VoP network, the setup message from the ingress gateway to an egress gateway configured for interfacing with the destination telephony switch according to a destination telephony signaling protocol, the VoP interface of the ingress gateway further configured for receiving from the egress gateway via the VoP network a message that includes second information describing the destination telephony signaling protocol;

the interworking resource of the ingress gateway configured for encapsulating and sending the signaling message to the egress gateway, via the VoP interface and the VoP network, according to a determined exchange type based on the second information.

20. The ingress gateway of claim 19, wherein the telephony interface is configured for receiving an IAM message as the signaling message according to a first ISDN User Part (ISUP) protocol as the source telephony signaling protocol.

21. The ingress gateway of claim 20, wherein the interworking resource is configured for generating a generic transparency descriptor specifying attributes for describing the first ISUP protocol relative to a prescribed superset of normalized parameters, the VoP interface configured for outputting an IP-based transport message, that includes the signaling message and the generic transparency descriptor, according to one of Session Initiation Protocol (SIP) or H.323 protocol.

22. The ingress gateway of claim 21, wherein the interworking resource is configured for specifying, within the generic transparency descriptor, a protocol name, a base protocol identifier, a country variant identifier, an operator identifier, and an operator version.

23. The ingress gateway of claim 22, wherein the superset of normalized parameters includes the signaling message parameters specified by ANSI T1.113 and ITU-T Q.761-Q.764 specifications implemented using an IP infrastructure.

24. The ingress gateway of claim 21, wherein VoP interface is configured for outputting the IP-based transport message according to SIP protocol, the message from the egress gateway being an INFO message according to SIP protocol that includes the second information.

25. The ingress gateway of claim 21, wherein the VoP interface is configured for outputting the IP-based transport message according to H.323 protocol, the message from the egress gateway being a Facility message according to H.323 protocol that includes the second information.

26. The ingress gateway of claim 19, wherein the second information specifies attributes for specifying the destination telephony signaling protocol, the interworking resource configured for selecting one of an interworking exchange type or a transit exchange type based on a determined compatibility between the source and destination telephony signaling protocols.

27. The ingress gateway of claim 19, wherein the second information specifies one of an interworking exchange type or a transit exchange type selected by the egress gateway, the interworking resource configured for utilizing the one exchange type specified in the second information for outputting the signaling message.

28. An egress gateway comprising:
a telephony interface configured for interfacing with a destination telephony switch according to a destination telephony signaling protocol;
a Voice over Packet (VoP) interface configured for receiving from an ingress gateway, via a Voice over Packet (VoP) network, a setup message that includes first information describing a source telephony signaling protocol used by the ingress gateway for interfacing with a source telephony switch having sent a signaling message destined for the destination telephony switch; and
an interworking resource configured for generating and outputting, via the VoP interface of the egress gateway and via the VoP network to the ingress gateway and in response to the setup message, a message that includes second information describing the destination telephony signaling protocol, the interworking resource causing the telephony interface of the egress gateway to initiate call setup with the destination telephony switch according to the destination telephony signaling protocol, and according to an exchange type determined based on the source telephony signaling protocol and the destination telephony signaling protocol.

29. The egress gateway of claim 28, wherein the first information includes a generic transparency descriptor specifying attributes for describing the source telephony signaling protocol relative to a prescribed superset of normalized parameters, the VoP interface configured for interfacing with the VoP network according to one of Session Initiation Protocol (SIP) or H.323 protocol.

30. The egress gateway of claim 29, wherein the interworking resource is configured for specifying within the second information a second generic transparency descriptor that specifies, for the destination telephony signaling protocol, a protocol name, a base protocol identifier, a country variant identifier, an operator identifier, and an operator version.

31. The egress gateway of claim 30, wherein the superset of normalized parameters includes the signaling message parameters specified by ANSI T1.113 and ITU-T Q.761-Q.764 specifications implemented using an IP infrastructure.

32. The egress gateway of claim 31, wherein the VoP interface is configured for sending the message as an INFO message according to SIP protocol.

33. The egress gateway of claim 31, wherein VoP interface is configured for sending the message as a Facility message according to H.323 protocol.

34. The egress gateway of claim 28, wherein the interworking resource is configured for:
selecting one of an interworking exchange type or a transit exchange type for the signaling message based on a determined compatibility between the source telephony signaling protocol and the destination telephony signaling protocol; and
specifying within the second information the selected one exchange type to be used by the ingress gateway and the egress gateway for the signaling message.

35. The egress gateway of claim 28, wherein the interworking resource is configured for causing the telephony interface to initiate the call setup after having sent the message including the second information.

36. The egress gateway of claim 28, wherein signaling message is an IAM message, the telephony interface configured for sending a new IAM message according to the destination telephony signaling protocol to the destination telephony switch.

37. The method of claim 1, wherein the outputting includes selecting the determined exchange type from a plurality of available exchange types based on the second information.

38. The method of claim 10, wherein the initiating includes selecting the exchange type from a plurality of available exchange types based on the source telephony signaling protocol and the destination telephony signaling protocol.

39. The ingress gateway of claim 19, wherein the interworking resource is configured for selecting the determined exchange type from a plurality of available exchange types based on the second information.

40. The egress gateway of claim 28, wherein the interworking resource is configured for selecting the exchange type from a plurality of available exchange types based on the source telephony signaling protocol and the destination telephony signaling protocol.

41. An apparatus comprising:
ingress means for receiving from a source telephony switch according to a source telephony signaling protocol a signaling message destined for a destination telephony switch;
means for generating a setup message that includes first information describing the source telephony signaling protocol;
means for sending, via a Voice over Packet (VoP) network, the setup message from the apparatus to an egress gateway configured for interfacing with the destination telephony switch according to a destination telephony signaling protocol, the means for sending of the apparatus further configured for receiving from the egress gateway via the VoP network a message that includes second information describing the destination telephony signaling protocol;
the means for generating of the apparatus configured for encapsulating and sending the signaling message to the egress gateway, via the means for sending and the VoP network, according to a determined exchange type based on the second information, wherein the apparatus is implemented as an ingress gateway.

42. The apparatus of claim 41, wherein the means for generating is configured for selecting the determined exchange type from a plurality of available exchange types based on the second information.

43. The apparatus of claim 41, wherein the means for generating is configured for generating a generic transparency descriptor specifying attributes for describing the source telephony signaling protocol relative to a prescribed superset of normalized parameters, the means for sending configured for outputting the setup message as an IP-based transport message that includes the signaling message and the generic transparency descriptor.

44. The apparatus of claim 41, wherein the second information specifies one of an interworking exchange type or a transit exchange type selected by the egress gateway, the means for generating configured for utilizing the one exchange type specified in the second information for outputting the signaling message.

45. An apparatus comprising:
  means for interfacing with a destination telephony switch according to a destination telephony signaling protocol;
  means for receiving from an ingress gateway, via a Voice over Packet (VoP) network, a setup message that includes first information describing a source telephony signaling protocol used by the ingress gateway for interfacing with a source telephony switch having sent a signaling message destined for the destination telephony switch; and
  means for generating and outputting, via the means for receiving of the apparatus and via the VoP network to the ingress gateway and in response to the setup message, a message that includes second information describing the destination telephony signaling protocol, the means for generating causing the means for interfacing of the apparatus to initiate call setup with the destination telephony switch according to the destination telephony signaling protocol, and according to an exchange type determined based on the source telephony signaling protocol and the destination telephony signaling protocol.

46. The apparatus of claim 45, wherein the means for generating is configured for selecting the exchange type from a plurality of available exchange types based on the source telephony signaling protocol and the destination telephony signaling protocol.

47. The apparatus of claim 45, wherein the first information includes a generic transparency descriptor specifying attributes for describing the source telephony signaling protocol relative to a prescribed superset of normalized parameters.

48. The apparatus of claim 45, wherein the means for generating is configured for:
  selecting one of an interworking exchange type or a transit exchange type for the signaling message based on a determined compatibility between the source telephony signaling protocol and the destination telephony signaling protocol; and
  specifying within the second information the selected one exchange type to be used by the ingress gateway and the egress gateway for the signaling message.

* * * * *

UNITED STATES PATENT AND TRADEMARK OFFICE
CERTIFICATE OF CORRECTION

PATENT NO. : 7,633,929 B1  Page 1 of 1
APPLICATION NO. : 10/409583
DATED : December 15, 2009
INVENTOR(S) : Fu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1590 days.

Signed and Sealed this

Twenty-first Day of December, 2010

David J. Kappos
*Director of the United States Patent and Trademark Office*